(12) United States Patent
Sipolins et al.

(10) Patent No.: US 11,749,132 B2
(45) Date of Patent: Sep. 5, 2023

(54) ENHANCED SPEED READING WITH EYE TRACKING AND BLINK DETECTION

(71) Applicant: Interntional Business Machines Corporation, Armonk, NY (US)

(72) Inventors: Aldis Sipolins, New York, NY (US);
Marco Cavallo, New York, NY (US);
Ravi Tejwani, Cambridge, MA (US);
Jenna Reinen, Greenwich, CT (US);
Hui Wu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 981 days.

(21) Appl. No.: 16/197,874

(22) Filed: Nov. 21, 2018

(65) Prior Publication Data

US 2020/0160744 A1    May 21, 2020

(51) Int. Cl.
*G09B 17/04* (2006.01)
*G09B 17/00* (2006.01)
*G06F 3/01* (2006.01)

(52) U.S. Cl.
CPC .............. *G09B 17/04* (2013.01); *G06F 3/013* (2013.01); *G09B 17/003* (2013.01)

(58) Field of Classification Search
CPC ...................................................... G09B 17/04
USPC ......................................................... 434/179
See application file for complete search history.

(56) References Cited

U.S. PATENT DOCUMENTS

| | | | |
|---|---|---|---|
| 7,639,146 B2 | 12/2009 | Baura | |
| 9,928,651 B2 * | 3/2018 | Mariappan | G06T 19/006 |
| 9,958,939 B2 | 5/2018 | Ghajar | |
| 2003/0038754 A1 * | 2/2003 | Goldstein | G06F 3/013 |
| | | | 345/7 |
| 2014/0016867 A1 | 1/2014 | Maurer et al. | |
| 2014/0143642 A1 * | 5/2014 | Cameron | G06F 3/0483 |
| | | | 715/201 |
| 2015/0213634 A1 | 7/2015 | Karmarkar et al. | |
| 2016/0062953 A1 | 3/2016 | Yoakum | |
| 2017/0199937 A1 | 7/2017 | Waldman et al. | |

FOREIGN PATENT DOCUMENTS

WO    2018/046957 A2    3/2018

OTHER PUBLICATIONS

Zhan, Zehui, et al., "Online Learners' Reading Ability Detection Based on Eye-Tracking Sensors", Sensors 2016, 17 pgs.

Wang, Yanfang, et al., "Blink Frequency and Duration during Perimetry and Their Relationship to Test-Retest Threshold Variability", IOVS, Jun. 2011, vol. 52, No. 7, pp. 4546-4550.

Benedetto, Simone, et al., "Rapid serial visual presenttion in reading: The case of Spritz", Computers In Human Behavior 45, 2015, pp. 352-358.

* cited by examiner

*Primary Examiner* — Kesha Frisby
(74) *Attorney, Agent, or Firm* — Harrington & Smith

(57) ABSTRACT

A method includes detecting an eye movement of a reader during a reading of presented text; determining, based on whether an eye movement is detected, whether the reader is looking at the presented text; pausing a presentation of the presented text if it is determined that the reader is not looking at the presented text; and resuming, if the presentation of the text is paused, the presentation of the presented text.

12 Claims, 4 Drawing Sheets

ENHANCED SPEED READING WITH EYE TRACKING AND BLINK DETECTION

BACKGROUND

The exemplary embodiments described herein relate generally to speed reading and, more specifically, to methods of controlling the presentation of text for speed reading based on movements of a reader's eyes.

Various methods of speed reading exist. Current speed reading methods include skimming (searching for clues as to the context of a textual passage and/or reading selected portions), scanning (organizing the read information according to hierarchical structure), and meta guiding (using a visual guide such as a pointer). Critics of speed reading techniques generally maintain that the only way to improve reading speed while maintaining comprehension is to practice reading and striving to improve language skills, such as increased vocabulary.

One technique for improving reading speed, however, is rapid serial visual presentation (RSVP). RSVP is an experimental model that is often used to examine the temporal characteristics of attention. The RSVP model requires that participants read by looking at a continuous presentation of visual items at a speed of about 10 items (words) per second. The words are all shown at a fixed location, and the reader maintains a gaze at the fixed location with no or minimal eye movement. In reading using the RSVP technique, the reader is able to rapidly view textual information, but such "reading" does not detect or correct for blinking or other eye movements made by the reader.

By presenting words at a fixed location, RSVP eliminates the need to make saccadic eye movements. Saccades are quick, simultaneous movements of both eyes between multiple phases of fixation in the same direction. For example, in reading a line of text from left to right, the reader's eyes jump three or four words at a time along the line, then return over the entire span of the line to the beginning of the next line. Limiting or eliminating saccadic eye movements generally increases reading speed quite dramatically. However, despite the effectiveness of speed reading via RSVP, the technique has not yet received widespread acceptance. Part of the reason for its lack of acceptance is that blinking during RSVP reading causes the reader to miss words. Furthermore, the reader's focus of attention on a single point without blinking often leads to eye fatigue.

A saccade takes between about 20 milliseconds (ms) and about 200 ms, which translates into about 2 words at 700 words per minute (wpm). A reader's attention is briefly disrupted after a saccade. Blinking is associated with saccadic movement, each blink taking between about 100 ms and 400 ms, which translates into about 1-4 words at 700 wpm. Speed reading dramatically reduces the occurrence of both intentional saccades and unintentional eye blinks.

BRIEF SUMMARY

In accordance with one aspect, a method comprises detecting an eye movement of a reader during a reading of presented text; determining, based on whether an eye movement is detected, whether the reader is looking at the presented text; pausing a presentation of the presented text if it is determined that the reader is not looking at the presented text; and resuming, if the presentation of the text is paused, the presentation of the presented text.

In accordance with another aspect, a computer system comprises one or more memories having computer readable code and one or more processors, wherein the one or more processors, in response to retrieving and executing the computer readable code, cause the computer system to perform the following: determining, based on whether an eye movement of a reader is detected, whether the reader is looking at presented text; pausing a presentation of the presented text if it is determined that the reader is not looking at the presented text; and resuming, if the presentation of the text is paused, the presentation of the presented text.

In accordance with another aspect, a computer program product comprises a computer readable storage medium having program instructions embodied therewith, the program instructions executable by a computer system to cause the computer system to perform operations comprising: determining, based on whether an eye movement of a reader is detected, whether the reader is looking at presented text; pausing a presentation of the presented text if it is determined that the reader is not looking at the presented text; and resuming, if the presentation of the text is paused, the presentation of the presented text.

BRIEF DESCRIPTION OF THE SEVERAL VIEWS OF THE DRAWINGS

The foregoing and other aspects of exemplary embodiments are made more evident in the following Detailed Description, when read in conjunction with the attached Drawing Figures, wherein.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Figure 1:
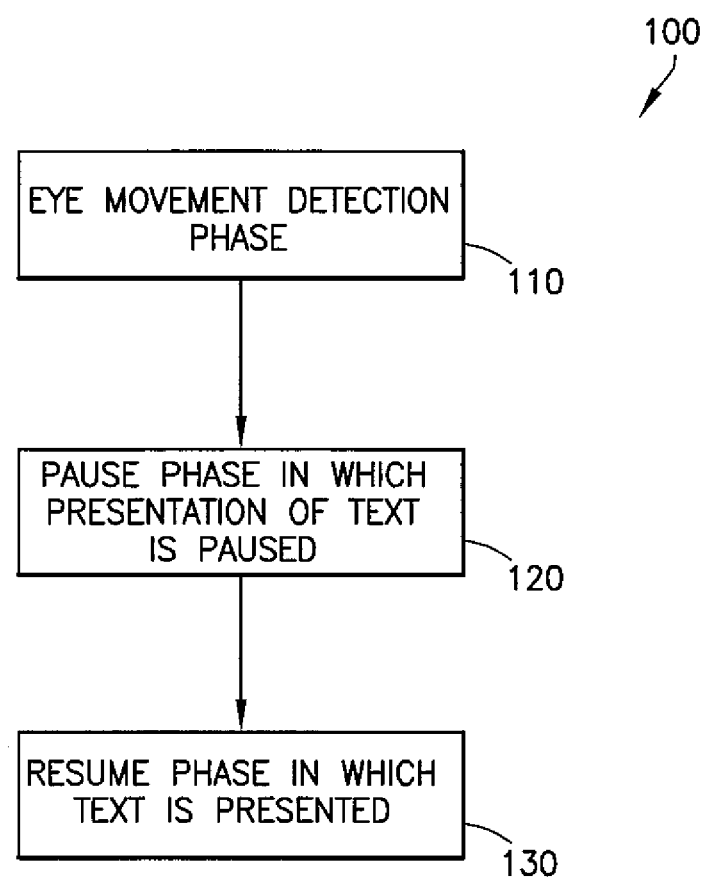
FIG. 1 is a flow of a method of enhancing speed reading using RSVP technology.

Referring to FIG. 1, one exemplary flow of various phases used for enhancing speed reading using RSVP technology is shown generally at 100 and is hereinafter referred to as "phase representation 100." In phase representation 100, an eye movement phase 110 is used to detect eye movement of a reader. Then, if the eyes of the reader are detected as moving, a determination is made that the reader is not looking at the text, and the presentation of the text is paused in a pause phase 120. Then, when the reader is subsequently detected as looking at the text, the presentation of the text is resumed in a resume phase 130.

The eye movement phase 110 is not only used to detect where the reader is looking, but also to detect blinking. A typical blink by a human takes about 100 ms to about 400 ms. For a reader using a speed reading technique and reading at 600 wpm, blinking translates into missing up to 4 words with each blink. For this reason, readers often report not blinking (or blinking much less often) while speed reading, thus leading to eye irritation and dryness. The eye movement phase 110, in conjunction with the pause phase 120 and the resume phase 130, is used to prevent the missing of information during saccades and real-time blinking.

Figure 2:
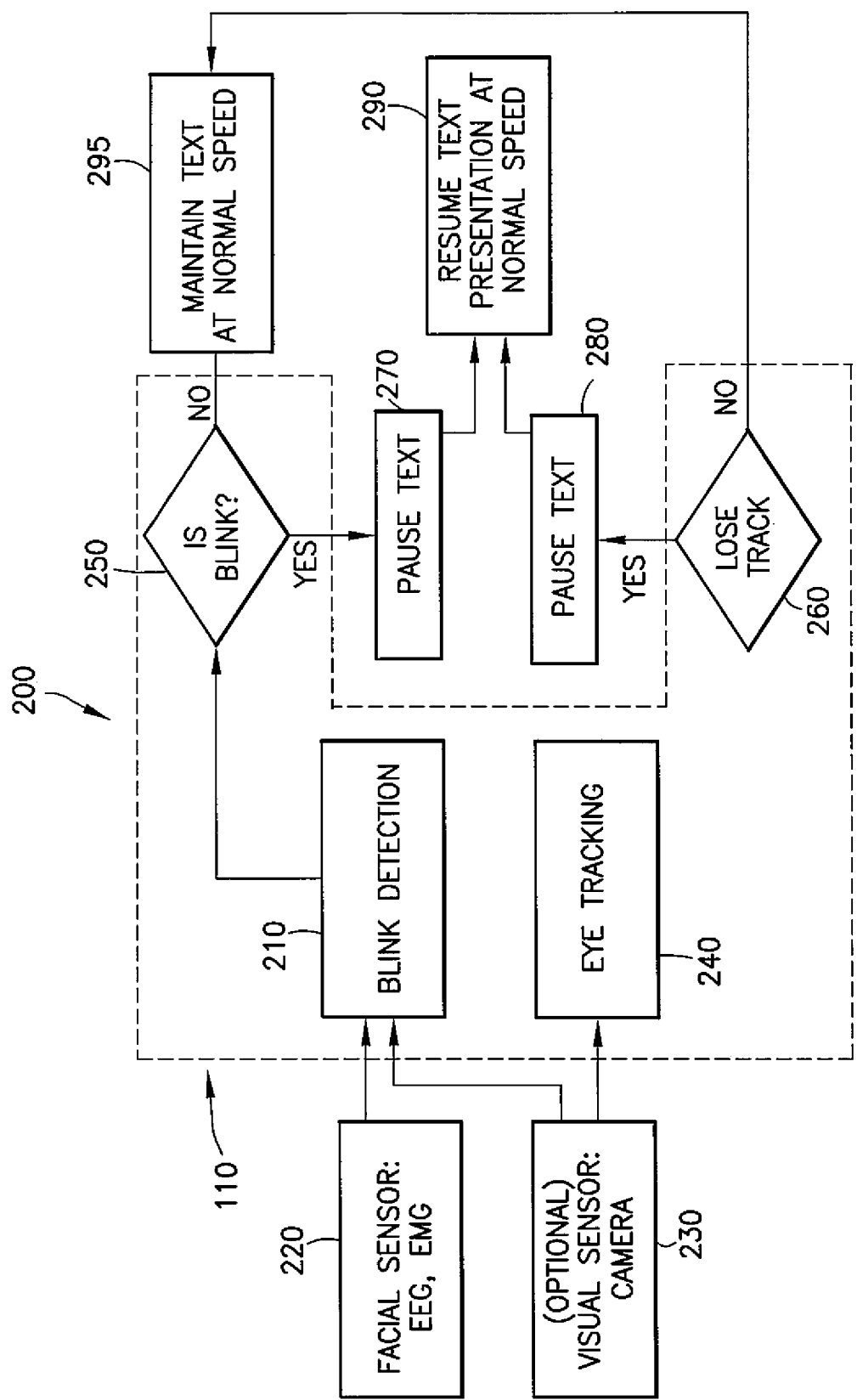
FIG. 2 is a flow of a method of carrying out the steps for the method of FIG. 1.

Referring to FIG. 2, one exemplary method of steps for carrying out each of the phases of the phase representation 100 is shown generally at 200 and is hereinafter referred to as "method 200." In method 200, the eye movement phase 110 is used to determine any movement of the eyeball (tracking) or related elements of the eye of the reader, such as eyelids, eyebrows, and the like. With regard to movement of the eyelids, eyebrows, and the like, blink detection 210 may be carried out using a facial sensor 220 that detects opening and closing of a reader's eyelid, such a facial sensor 220 comprising, for example, an electroencephalography (EEG) apparatus, an electromyography (EMG) apparatus, or a combination thereof. A computer vision (CV) method may also be used, or an RGB (red green blue) or infrared sensor may be used to detect blinks. Optionally, a camera or other visual sensor 230 may also be used for the blink detection 210.

In the blink detection 210, a decision 250 is made as to whether the reader blinked, which is construed herein as the eyelid closing over the eyeball and subsequently opening. If it is determined that the reader is in fact blinking (closing the eyelid over the eyeball), it is also determined that the reader is not seeing a portion of the text, and the text is paused, as indicated at 270. Pausing of the text comprises momentarily stopping the presentation of the text until it is determined that the reader's eyelid is no longer closed over the eyeball. A sensor may detect both the opening and closing of the eyelid. Thus, the pause for blinking corresponds to the length of the blink. The text presentation is then resumed based on a detected opening of the eyelid.

The camera or other visual sensor 230 may further be used for eye tracking 240, which may be construed herein as movement of the eyeball itself laterally (left or right) or longitudinally (up or down), which generally means the reader's gaze deviated from the presented text. In the eye tracking 240, a decision 260 is made as to whether the reader's eyes are moving (such as, for example) due to saccadic movements and whether the reader's eyes are likely not seeing the text. Measurements of the movements may be taken, an analysis may be carried out, and the movement may be classified as one type of movement or another. If it is determined that the reader's eyes are moving due to saccadic movements or are otherwise losing track of the text, it is again determined that the reader did not see a portion of the text, and the text is again paused, as indicated at 280. As with pausing due to blinking, pausing of the text based on the detection of eye tracking 240 comprises momentarily stopping the presentation of the text until it is determined that the reader's eyeball is no longer tracking. Thus, the pause for eye movement corresponds to the length of time that the eye is looking away (in other words, while the gaze is not centered). For eye tracking 240, the camera or other visual sensor 230 may be calibrated to a particular reader's eyes.

When pausing 270 or pausing 280, the presented text is stopped on a word as opposed to a space between two words.

After pausing 270, 280, the text presentation is resumed at normal speed, as indicated at 290. Normal speed is a predetermined or preselected speed of text presentation based on the ability of the reader. Thus, any blink detection (and eye tracking detection) and the subsequent resuming of the presented text occurs in real-time. Real-time means that the determination of whether a blink or tracking was detected and the subsequent pausing of the presented text and the subsequent resuming of the presented text occurs substantially instantaneously and without a measurable or at least significant time lapse. If there is no pausing 270, 280, in other words if there is no blink detection 210 or if there is no eye tracking 240, the text presentation is maintained at normal speed, as indicated at 295.

Figure 3:
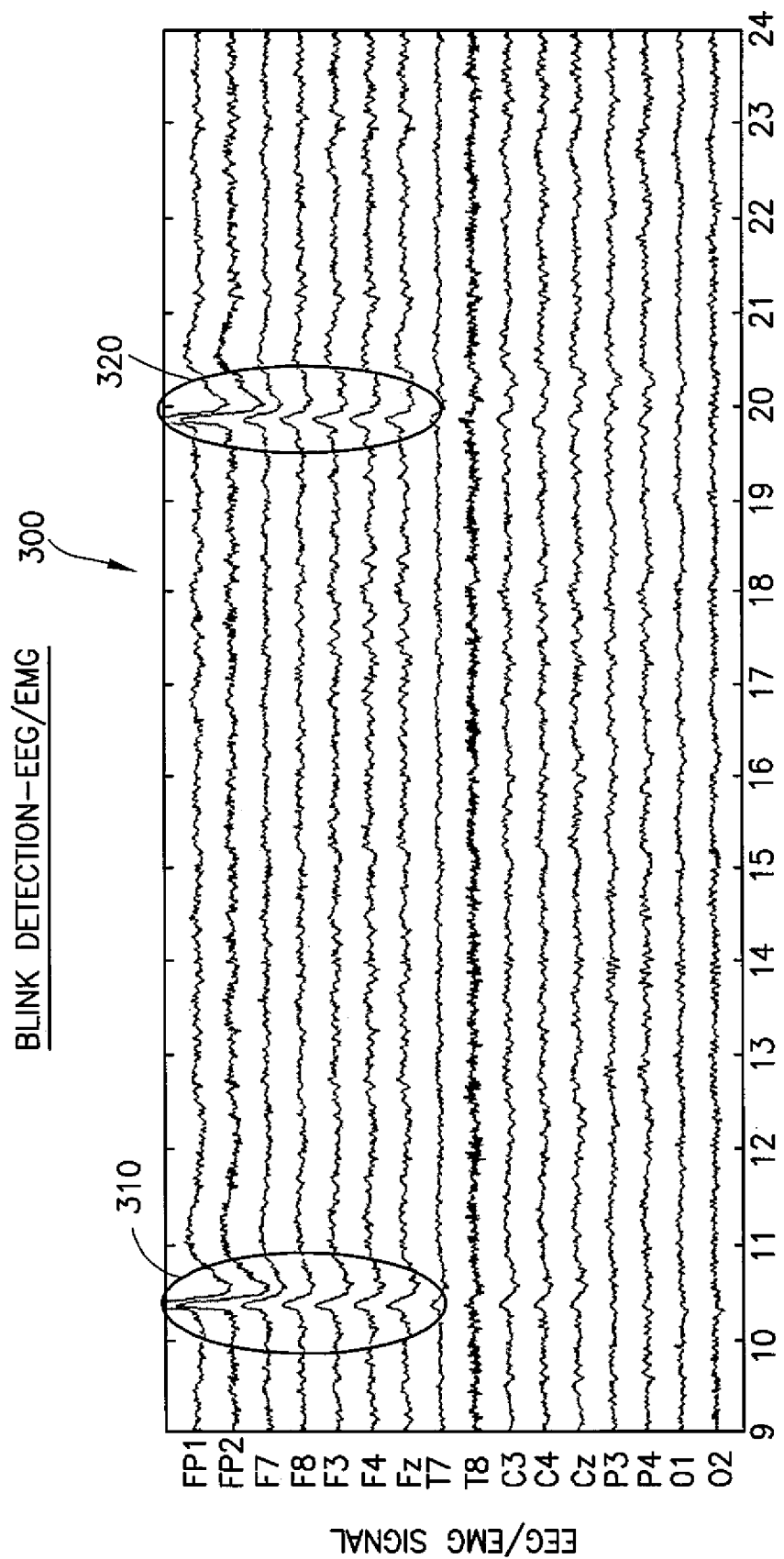
FIG. 3 is a graphical illustration of one exemplary output of data from a blink detection.

Referring now to FIG. 3, one example of output graphical data from a blink detection 210 by EMG/EEG is shown at 300. In graph 300, a first aberration 310 is noted at about 10.5 ms, and a second aberration 320 is noted at about 20 ms, each of the first aberration 310 and the second aberration 320 being characterized by spikes in signal.

Figure 4:
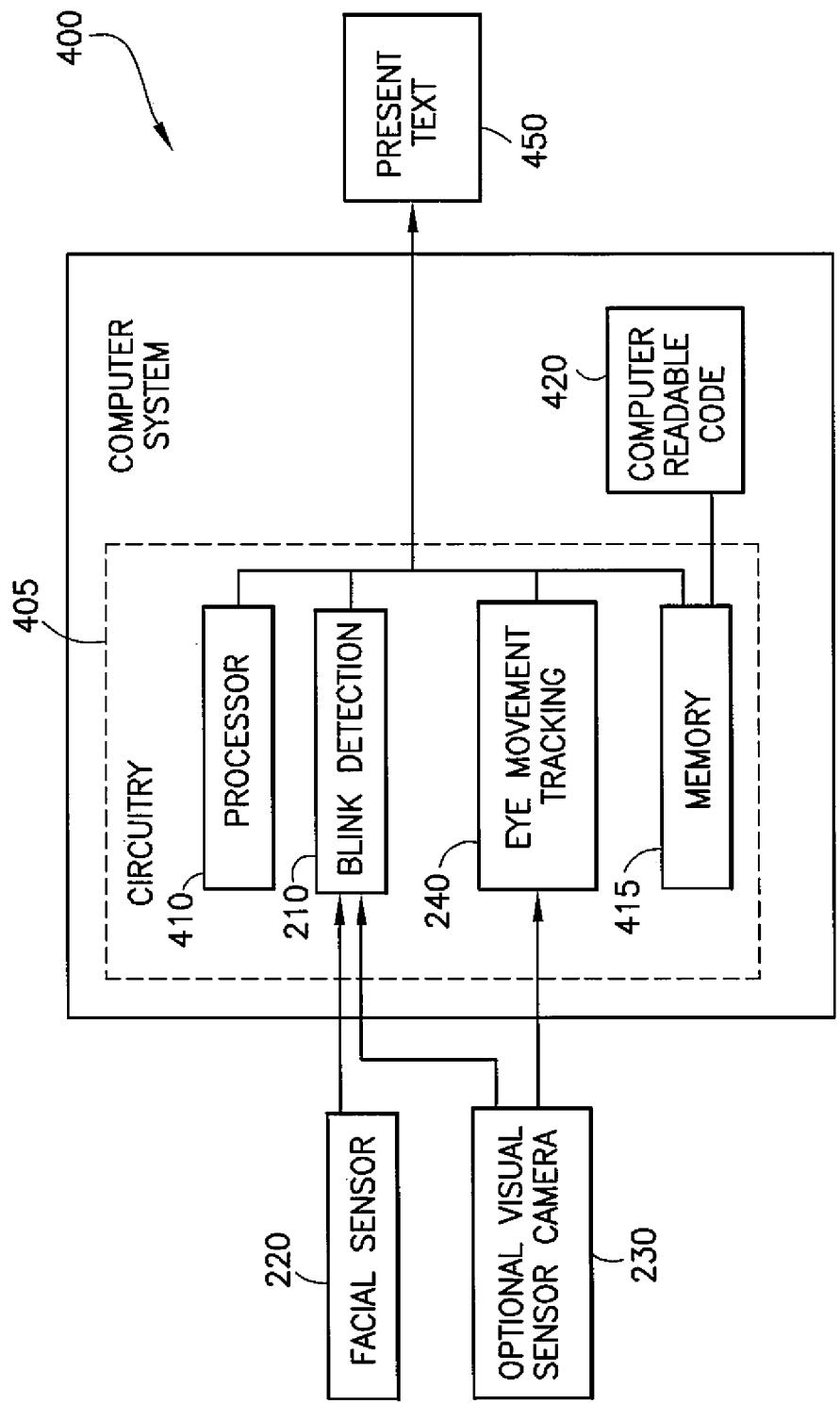
FIG. 4 is a block diagram of elements that may be used in conjunction with methods of enhancing speed reading using RSVP technology.

Referring to FIG. 4, the method 200 may be carried out using a computer system 400 having circuitry 405 with one or more processors 410 and associated memories 415. The memories 415 may include computer readable code 420, which when accessed and executed by the one or more processors 410, causes the computer system 400 to perform the operations described herein, such as those described in the Figures. The operations may be implemented in whole or part in the circuitry 405, which itself may implement the one or more memories 415 and the one or more processors 410. For instance, the circuitry 405 may implement the blink detection 210 and the eye tracking 240, both of which may be carried out using an integrated circuit or as part of a programmable logic device associated with the facial sensor 220 and the camera or visual sensor 230. Input to the computer system 400 may be received through one or more of the facial sensor 220 and the camera or visual sensor 230, and output may be provided to the user as presented text 450.

The present invention may be a method, a system, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one example, a method comprises detecting an eye movement of a reader during a reading of presented text; determining, based on whether an eye movement is detected, whether the reader is looking at the presented text; pausing a presentation of the presented text if it is determined that the reader is not looking at the presented text; and resuming, if the presentation of the text is paused, the presentation of the presented text.

Detecting an eye movement of a reader may comprise detecting one or more of a blink and a tracking movement. Detecting a blink may comprise sensing a movement of an eyelid closing and opening over an eyeball of the reader. Detecting a tracking movement may comprise sensing a lateral or longitudinal movement of the eyeball of the reader. Sensing a movement of an eyelid closing and opening over an eyeball of the reader may comprise sensing movement of one or more of an eyelid and an eyebrow using one or more of a camera, an electroencephalography apparatus, an electromyography apparatus, a computer vision apparatus, a red green blue sensing apparatus, and an infrared sensing apparatus. Sensing a lateral or longitudinal movement of the eyeball of the reader may comprise sensing movement of the eyeball using the camera. Determining, based on whether an eye movement is detected, whether the reader is looking at the presented text may comprise determining whether the reader closed their eyes or whether the reader's gaze deviated from the presented text. Pausing a presentation of the presented text if it is determined that the reader is not looking at the presented text may comprise stopping the presented text on a word of the presented text. Resuming, if the presentation of the text is paused, the presentation of the presented text may comprise resuming the presentation of the text at a preselected speed based on the ability of the reader. Determining, based on whether an eye movement is detected, whether the reader is looking at the presented text, pausing a presentation of the presented text if it is determined that the reader is not looking at the presented text, and resuming, if the presentation of the text is paused, the presentation of the presented text may occur in real-time.

In another example, a computer system comprises one or more memories having computer readable code and one or more processors, wherein the one or more processors, in response to retrieving and executing the computer readable code, cause the computer system to perform the following: determining, based on whether an eye movement of a reader is detected, whether the reader is looking at presented text; pausing a presentation of the presented text if it is determined that the reader is not looking at the presented text; and resuming, if the presentation of the text is paused, the presentation of the presented text.

Determining, based on whether an eye movement of a reader is detected, whether the reader is looking at presented text may comprise determining whether the reader closed their eyes or whether the reader's gaze deviated from the presented text. Pausing a presentation of the presented text if it is determined that the reader is not looking at the presented text may comprise stopping the presented text on a word of the presented text. Resuming, if the presentation of the text is paused, the presentation of the presented text may comprise resuming the presentation of the text at a preselected speed based on the ability of the reader. Determining, based on whether an eye movement of a reader is detected, whether the reader is looking at presented text, pausing a presentation of the presented text if it is determined that the reader is not looking at the presented text, and resuming, if the presentation of the text is paused, the presentation of the presented text may occur in real-time.

In another example, a computer program product comprises a computer readable storage medium having program instructions embodied therewith, the program instructions executable by a computer system to cause the computer system to perform operations comprising: determining, based on whether an eye movement of a reader is detected, whether the reader is looking at presented text; pausing a presentation of the presented text if it is determined that the reader is not looking at the presented text; and resuming, if the presentation of the text is paused, the presentation of the presented text.

In the foregoing description, numerous specific details are set forth, such as particular structures, components, materials, dimensions, processing steps, and techniques, in order to provide a thorough understanding of the exemplary embodiments disclosed herein. However, it will be appreciated by one of ordinary skill of the art that the exemplary embodiments disclosed herein may be practiced without these specific details. Additionally, details of well-known structures or processing steps may have been omitted or may have not been described in order to avoid obscuring the presented embodiments.

The description of the present invention has been presented for purposes of illustration and description, but is not intended to be exhaustive or limiting in the form disclosed. Many modifications and variations will be apparent to those of ordinary skill in the art without departing from the scope of the invention. The embodiments were chosen and described in order to best explain the principles of the invention and the practical applications, and to enable others of ordinary skill in the art to understand the invention for various embodiments with various modifications as are suited to the particular uses contemplated.

What is claimed is:

1. A method, comprising:
   detecting an eye movement of a reader during a reading of presented text;
   determining, based on whether an eye movement is detected and sustained over a specified period of time, whether the reader is looking at the presented text;
   pausing a presentation of the presented text at a word of the presented text if it is determined that the reader is not looking at the presented text; and
   resuming, if the presentation of the text is paused, the presentation of the presented text from the word of the presented text at which the presented text was paused;
   wherein the determining of whether the reader is looking at the presented text, the pausing of the presentation of the presented text, and the resuming of the presented text, if the presentation of the presented text is paused, occurs in real-time based on the eye movement and without a measurable time lapse in the text presentation.

2. The method of claim 1, wherein detecting an eye movement of a reader comprises detecting one or more of a blink and a tracking movement.

3. The method of claim 2, wherein detecting a blink comprises sensing a movement of an eyelid closing and opening over an eyeball of the reader, and wherein detecting a tracking movement comprises sensing a lateral or longitudinal movement of the eyeball of the reader.

4. The method of claim 3, wherein sensing a movement of an eyelid closing and opening over an eyeball of the reader comprises sensing movement of one or more of an eyelid and an eyebrow using one or more of a camera, an electroencephalography apparatus, an electromyography apparatus, a computer vision apparatus, a red green blue sensing apparatus, and an infrared sensing apparatus, and
   wherein sensing a lateral or longitudinal movement of the eyeball of the reader comprises sensing movement of the eyeball using the camera.

5. The method of claim 1, wherein determining, based on whether an eye movement is detected, whether the reader is looking at the presented text comprises determining whether the reader closed their eyes or whether the reader's gaze deviated from the presented text.

6. The method of claim 1, wherein pausing a presentation of the presented text if it is determined that the reader is not looking at the presented text comprises stopping the presented text on the word of the presented text.

7. The method of claim 1, wherein resuming, if the presentation of the text is paused, the presentation of the presented text comprises resuming the presentation of the text at a preselected speed based on the ability of the reader.

8. A computer system, comprising:
   one or more memories having computer readable code; and
   one or more processors, wherein the one or more processors, in response to retrieving and executing the computer readable code, cause the computer system to perform the following:
   determining, based on whether an eye movement of a reader is detected and sustained over a specified period of time, whether the reader is looking at presented text;
   pausing a presentation of the presented text at a word of the presented text if it is determined that the reader is not looking at the presented text; and
   resuming, if the presentation of the text is paused, the presentation of the presented text from the word in the text at which the presented text was paused;
   wherein the determining of whether the reader is looking at the presented text, the pausing of the presentation of the presented text, and the resuming of the presented text, if the presentation of the presented text is paused, occurs in real-time based on the eye movement and without a measurable time lapse in the text presentation.

9. The computer system of claim 8, determining, based on whether an eye movement of a reader is detected, whether the reader is looking at presented text comprises determining whether the reader closed their eyes or whether the reader's gaze deviated from the presented text.

10. The computer system of claim 8, wherein pausing a presentation of the presented text if it is determined that the reader is not looking at the presented text comprises stopping the presented text on the word of the presented text.

11. The computer system of claim 8, wherein resuming, if the presentation of the text is paused, the presentation of the presented text comprises resuming the presentation of the text at a preselected speed based on the ability of the reader.

12. A computer program product comprising a computer readable storage medium having program instructions embodied therewith, the program instructions executable by a computer system to cause the computer system to perform operations comprising:
  determining, based on whether an eye movement of a reader is detected and sustained over a specified period of time, whether the reader is looking at presented text;
  pausing a presentation of the presented text at a word of the presented text if it is determined that the reader is not looking at the presented text; and
  resuming, if the presentation of the text is paused, the presentation of the presented text from the word of the presented text at which the presented text was paused;
  wherein the determining of whether the reader is looking at the presented text, the pausing of the presentation of the presented text, and the resuming of the presented text, if the presentation of the presented text is paused, occurs in real-time based on the eye movement and without a measurable time lapse in the text presentation.

\* \* \* \* \*